US011657973B2

(12) United States Patent
Qi et al.

(10) Patent No.: US 11,657,973 B2
(45) Date of Patent: May 23, 2023

(54) CAPACITOR WITH INSULATION COMPOSITION SHOWING THERMO-REVERSIBLE OIL-TO-GEL-TRANSITION

(71) Applicant: Hitachi Energy Switzerland AG, Baden (CH)

(72) Inventors: LeJun Qi, Beijing (CN); Saskia Scheel, Lenzburg (CH); Emmanuel Logakis, Baden-Dättwil (CH); Felix Bandalo, Ludvika (SE); Richard-changyu Zhang, Xi'an (CN); Biswajit Singh, Västeras (SE)

(73) Assignee: Hitachi Energy Switzerland AG, Baden (CH)

( * ) Notice: Subject to any disclaimer, the term of this patent is extended or adjusted under 35 U.S.C. 154(b) by 246 days.

(21) Appl. No.: 16/982,278

(22) PCT Filed: Mar. 11, 2019

(86) PCT No.: PCT/EP2019/056038
§ 371 (c)(1),
(2) Date: Sep. 18, 2020

(87) PCT Pub. No.: WO2019/179811
PCT Pub. Date: Sep. 26, 2019

(65) Prior Publication Data
US 2021/0043381 A1 Feb. 11, 2021

(30) Foreign Application Priority Data
Mar. 19, 2018 (CN) .......................... 201810224573.0

(51) Int. Cl.
*H01G 4/224* (2006.01)
*C08L 91/00* (2006.01)
(Continued)

(52) U.S. Cl.
CPC .............. *H01G 4/224* (2013.01); *C08L 91/00* (2013.01); *H01G 2/10* (2013.01); *H01G 2/12* (2013.01); *H01G 4/32* (2013.01)

(58) Field of Classification Search
CPC .............. H01G 4/35; H01G 4/04; H01G 4/20
See application file for complete search history.

(56) References Cited

U.S. PATENT DOCUMENTS

| | | | | |
|---|---|---|---|---|
| 4,117,579 A | * | 10/1978 | Shaw | ...................... H01G 4/221 |
| | | | | 29/25.42 |
| 4,633,367 A | * | 12/1986 | Strange | ..................... H01G 2/14 |
| | | | | 361/327 |

(Continued)

FOREIGN PATENT DOCUMENTS

| | | |
|---|---|---|
| AU | 1988899 A | 7/1999 |
| CN | 1285077 A | 2/2001 |

(Continued)

OTHER PUBLICATIONS

International Search Report and Written Opinion of the International Searching Authority, PCT/EP2019/056038, dated Jul. 4, 2019, 13 pages.

(Continued)

*Primary Examiner* — Eric W Thomas
(74) *Attorney, Agent, or Firm* — Sage Patent Group (57) ABSTRACT

A wet capacitor is provided, and the use of an insulation fluid composition in such a capacitor. The capacitor includes a package of a metal foil and a polymeric insulating film, or of a metallized polymeric film, wherein the insulation composition includes a synthetic or natural aromatic oil and a polymer. The insulation composition is configured to undergo a thermo-reversible oil-to-gel transition at a predefined gel-point temperature. Further, methods of producing such wet capacitors are provided, optionally including (Continued)

additional filling materials, and methods of sealing leaks in such capacitors.

11 Claims, 3 Drawing Sheets

(51) Int. Cl.
*H01G 4/32* (2006.01)
*H01G 2/12* (2006.01)
*H01G 2/10* (2006.01)

(56) References Cited

U.S. PATENT DOCUMENTS

| | | | |
|---|---|---|---|
| 4,654,751 A | 3/1987 | Tokurn et al. | |
| 5,306,739 A | 4/1994 | Lucey | |
| 6,010,743 A | 1/2000 | Berger | |
| 6,316,542 B1 * | 11/2001 | Berger | C08G 18/0852 |
| | | | 524/789 |
| 6,391,447 B1 | 5/2002 | Kornfeldt et al. | |
| 8,110,011 B2 | 2/2012 | Bulliard et al. | |
| 8,159,812 B2 | 4/2012 | Eriksson | |
| 2002/0141135 A1 | 10/2002 | Henderson et al. | |
| 2003/0133255 A1 * | 7/2003 | Reiner | H01G 4/224 |
| | | | 361/517 |
| 2012/0101204 A1 | 4/2012 | Adams | |

FOREIGN PATENT DOCUMENTS

| | | | | |
|---|---|---|---|---|
| CN | 103035405 A | | 4/2013 | |
| EP | 199353 A | * | 10/1986 | ............ H01G 4/015 |
| EP | 0231402 A1 | | 8/1987 | |
| GB | 2168991 A | | 7/1986 | |
| JP | 06055235 A | * | 3/1994 | |
| JP | 2001176553 A | | 6/2001 | |
| JP | 2001176554 A | | 6/2001 | |
| JP | 2001297626 A | | 10/2001 | |
| JP | 2002358823 A | | 12/2002 | |
| SE | 9704828 L | | 12/1997 | |
| SE | 1651576 | | 12/2016 | |
| WO | WO 1999/033071 A1 | | 7/1999 | |
| WO | WO 01/52284 A1 | | 7/2001 | |

OTHER PUBLICATIONS

Kim, J. K., et al., "Viscoelastic And Gelation Studies of SEBS Thermoplastic Elastomer in Different Hydrocarbon Oils," Macromolecular Research, vol. 14, No. 3, pp. 365-372 (2006).
Office Action, Indian Patent Office, IN202047040077, dated Mar. 10, 2021, 6 pages.
Office Action, Chinese Patent Office, 201810224573.0, dated Apr. 20, 2022, 1 page.
Notification of the First Office Action, Chinese Patent Application No. 201810224573.0, dated Jan. 10, 2022, 4 pages.
Rongesheng, F., et al., "A Manual of Formulas and Tables Commonly Used by Scientific and Technical Personnel," Aug. 31, 1991, Machinery Industry Press, pp. 504-505.

* cited by examiner

Fig. 6A    Fig. 6B    Fig. 6C ns of the capacitor, which means that the insulation composition is typically in a gel state outside the capacitor and in a liquid state inside the capacitor.

CAPACITOR WITH INSULATION COMPOSITION SHOWING THERMO-REVERSIBLE OIL-TO-GEL-TRANSITION

CROSS REFERENCE TO RELATED APPLICATIONS

This application is a 35 U.S.C. § 371 national stage application of PCT International Application No. PCT/EP2019/056038 filed on Mar. 11, 2019, which in turn claims foreign priority to Chinese Patent Application No. 201810224573.0, filed on Mar. 19, 2018, the disclosures and content of which are incorporated by reference here in in their entirety.

FIELD

Aspects of the present disclosure relate to capacitors with a filling of an insulation composition. More particularly, the disclosure relates to the insulation composition itself, its components, and its use in such capacitors, as well as to methods for producing such capacitors and to methods for treating leaks by employing such insulation compositions.

TECHNICAL BACKGROUND

Wet capacitors are typically filled with an oil or oil mixture, which may e.g. be synthetic, from mineral sources, or from organic sources. In either case, an undesired leakage of a part of the oil filling in case of failure or fatigue may lead to a contamination of the surroundings of the capacitor. This may be particularly undesirable and problematic, when the spilled oil can reach and contaminate a natural environment. Due to corrosion on, e.g., a metal container of the capacitor, and/or due to mechanical damage on the ceramic bushings, and/or due to ageing of sealing rubber, such leakage of oil-filled wet capacitors may happen and may result in environmental damage, increase maintenance cost and downtime. To mitigate the environmental damage, especially to a water body, a well-known solution to the above problem is to provide a dedicated concrete reservoir underneath capacitor banks. This, however, is accompanied by a number of disadvantages, such as a significantly increased weight, higher cost, and an increased construction effort for the whole system. In view of the above and for other reasons, there is a need for the present invention.

SUMMARY OF THE INVENTION

According to a first aspect, a capacitor is provided. It includes a container, which includes at least one wound package of a metal foil and a polymeric insulating film, or of a metallized polymeric film. Further, the container comprises an insulation composition, wherein the insulation composition comprises a synthetic or natural aromatic oil, and a polymer in a concentration of about 0.1 wt % to about 10 wt %. The insulation composition is configured to undergo a thermo-reversible gelation below a gel-point temperature in the range from about 30° C. to about 90° C., wherein the gel point is defined as the temperature at which the storage modulus G' of the insulation composition is equal to the loss modulus G" of the insulation composition.

According to a second aspect, a use of an insulation fluid composition in a capacitor including a package of a metal foil and a polymeric insulation film, or of a metallized polymeric film, is provided. The insulation composition comprises a synthetic or natural aromatic oil, and a polymer, wherein the insulation composition is configured to undergo a thermo-reversible oil-to-gel transition below a predefined gel-point temperature of the insulation composition.

According to a third aspect, a method of treating a leak in a capacitor is provided. The method comprises providing a capacitor device having a container comprising a package of a metal foil and a polymeric insulating film, or of a metallized polymeric film, and an insulation composition; operating the capacitor, wherein the insulation composition is configured such that the insulation composition is in a liquid phase during standard operation of the capacitor; and in case of a leak in the capacitor to the outside, spilling an amount of the insulation composition through the leak to an outside of the container, wherein the spilled amount undergoes a thermo-reversible oil-to-gel transition during or after the spilling when exposed to the temperature outside the container.

According to a fourth aspect, a method of producing a capacitor of the first aspect is provided. The method comprises wrapping packages of polymeric capacitor films and metal foils, or of metallized polymeric films, by insulating papers; impregnating the wrapped packages with a heated insulation composition, at a reduced pressure and an elevated temperature, to allow the insulation composition to impregnate the package, and letting the films swell for several hours; cooling the container with the packages and gel to room temperature; refilling insulation composition to compensate shrinkage; and sealing the container; or, the method comprises adding hot gel into the container with film/foil or of metallized film packages at below the gel transition temperature; filling the container with aromatic oil at reduced pressure below the gel transition temperature; sealing the container; heating the container to about 80° C., and mixing gel and oil at elevated temperature; cooling the container down to room temperature; or, the method comprises filling the container with film/foil or of metallized film package with insulation composition at reduced pressure; storing for 20-60 hours to allow the films to swell in the oil; removing excessive oil that was not absorbed by the wrapped package by emptying the container at room temperature; heating the container to about 80° C.; filling the container with hot insulation composition, or optionally, filling up with a plastic material or with a mineralic substance, in particular with polyurethane or sand, or with a mixture of the former; cooling the container down to room temperature; filling up insulation composition to compensate shrinkage; and sealing the container.

According to a fifth aspect, a capacitor is provided. It includes a container, which includes at least one wound package of a metal foil and a polymeric insulating film, or of a metallized polymeric film, and an oil-based insulation composition absorbed by the wound package. A space in the container, other than the wound package, is filled up with a plastic material or with a mineralic substance, in particular with polyurethane or sand, or filled up with a mixture of any of the former with a dielectric fluid.

Aspects and embodiments described herein generally relate to an aromatic-oil-based insulation system or insulation composition including a polymer, which exhibits a thermo-reversible oil-to-gel transition. This means that the insulation composition (henceforth also simplified called "oil" for practical reasons) is configured to be in a liquid state at normal operational temperatures of the capacitor(s) in which it is used, and gels when it cools down to a temperature of an environment of the capacitor. The environmental temperature is typically lower than the operating temperature of the capacitor. The employed gelation process is highly useful for preventing environmental damage occurring from any type of leakage—since the gel stays, e.g., only on a surface of a contaminated area of soil, for example, and is not able to penetrate the soil. The gel can subsequently easily be removed from the contaminated soil or other area. Hence, an environmental friendly solution is provided. It can also lead to significant weight reduction and cost reduction when applied in, e.g., capacitor banks, as conventionally used underneath-placed concrete or metal oil reservoirs (also called fall-back reservoir) may be omitted. Furthermore, the overall life cycle may be improved, and maintenance costs can be reduced, as small leakages can be self-healed by the gel, or at least be retarded, such that the time until arrival of maintenance personnel on the repair site may be prolonged, thereby increasing a respective planning flexibility.

The insulation compositions as described herein are based on synthetic or natural aromatic oils, or mixtures thereof, and are used for the electrical insulation in wet capacitors. Relatively low amounts of a polymer, typically less than about 10 wt. %, may be comprised in the insulation composition in order to induce a thermo-reversible oil-to-gel transition. Thus, the oil remains in the liquid state at operational temperatures, which enables heat dissipation through convection, and gels below a certain temperature which may be selected to be a few degrees higher than the maximum environmental temperature which the product experiences under standard operating conditions. In the event of a leakage, the insulation composition, being exposed to the lower environmental temperature, gels fast, and hence any environmental related hazard is avoided, respectively minimized, as was described above.

Further advantages, features, aspects and details that can be combined with embodiments described herein are evident from the dependent claims, claim combinations, the description and the drawings.

BRIEF DESCRIPTION OF THE FIGURES

More details will be described in the following with reference to the figures, wherein.

DETAILED DESCRIPTION OF ASPECTS OF THE INVENTION

In the following, some aspects of the invention are described in detail. Aspects and parts of aspects are independent of each other and can be combined in any manner. For example, any aspect or embodiment described in this document can be combined with any other aspect or embodiment, as long as the combinations achieved are technically feasible, or unless the contrary is mentioned.

According to an aspect, in a capacitor of the first aspect above, the insulation composition has a complex viscosity, at a temperature below the gel point, which is about a factor 100 larger than the complex viscosity at temperatures above the gel point.

According to an aspect, the insulation composition has a complex viscosity of equal or greater than 0.01 Pa=s at a temperature below the gel point, and a complex viscosity at temperatures above the gel point which is substantially equal, with a difference of less than about 30%, to the complex viscosity of the insulation composition without the polymer.

According to an aspect, the polymer comprises a polymer and/or a copolymer and/or a block copolymer, preferably a tri-block copolymer and/or a di-block copolymer, which is preferably at least one of: ethylene butyl acrylate; styrene-ethylene-(ethylene-isopropylene)-styrene; ethylene-vinylacetate; ethylene-butyleneacrylate; and syndiotactic polystyrene.

According to an aspect, the insulation composition further comprises an additive, being at least one of: an inorganic filler, at a concentration of 10 wt. % or less based on the total weight of the insulation composition, and an antioxidant, at a concentration of 2 wt. % or less based on the total weight of the insulation composition.

According to an aspect, the aromatic oil comprises a benzyl-toluene.

According to aspects, the insulation composition is configured to undergo a thermo-reversible oil-to-gel transition below a defined temperature, which is chosen to be about 1° C. to about 10° C. higher than the maximum environmental temperature expected during operation of the capacitor. Thereby, an oil-to-gel transition of a leaked amount of insulation composition is fostered or caused under all normal operating conditions of the capacitor.

DETAILED DESCRIPTION OF EXEMPLARY EMBODIMENTS

In the following, detailed embodiments of the invention are described, which shall not be regarded to be limiting for the invention.

Generally, the terms "gel point", "transition point", and "transition temperature" may be used interchangeably herein. Further, the terms "gel formation", "gelation", and "gel transition" may be used interchangeably. Complex viscosity is defined as frequency-dependent viscosity function determined for a viscoelastic fluid by subjecting it to oscillatory shear stress.

The insulation composition employed according to embodiments is configured to exhibit a thermo-reversible oil-to-gel transition below a certain predefined temperature, herein also called transition point. This means that the insulation composition (henceforth also simplified called "oil" for practical reasons) is configured to be in a liquid state at normal operational temperatures of the capacitor or at higher temperatures, and is configured to transform into a gel when it cools down below that transition point, and vice versa. This behaviour is fostered or caused in embodiments by adding a polymer to the aromatic oil, which is described below in detail.

Hence, the term "insulation composition", as used herein, relates to a mixture comprising at least an aromatic oil and a polymer. The insulation composition is typically in a fluid state at a temperature above the gel point or transition temperature (with a few exceptions, as laid out below), and is in a gelated or gel state, having a significantly higher complex viscosity, at temperatures below the gel point or transition temperature.

The thermo-reversibility of the oil-to-gel-transition enables to cool down a capacitor, e.g. during downtime, which leads to the insulation composition transforming into the gel state. When the capacitor is put into operation again, the gel will thus re-transform into a liquid.

Hence, below the transition point, the complex viscosity increases significantly as the insulation composition is a in a gel or gelated state. According to embodiments, the insulation composition typically cools down to below the transition point in case of a leakage of the insulation composition, hence when a leaked amount reaches the temperature of an environment around the respective device. The transition may in embodiments already occur during the leaking process—for example, if the leak is very small, such as e.g. an irregularity in a welding that has expanded into a small leak by corrosion—such that the gelation process may already occur in the small cavity of the leak. This may happen, e.g., when the outside face of the enclosure at the position of the leak has a temperature lower than the transition point of the employed insulation composition.

The formed gel in the leak itself may, according to embodiments, block a leak entirely, which can be regarded as a self-healing process of a leak. If this process is sufficient to fully block a leak is dependent on, e.g., the size of the leak, in particular its diameter, its geometry, the hydrostatic pressure of the insulation composition in the enclosure at the position of the leak, the complex viscosity of the insulation composition or gel, and the temperature distribution along the "channel" of the leak leading from the inside of the enclosure to the outside face of the enclosure, which influences along which part of the length of the leak channel there is a gel formation.

Generally, for the application of an insulation composition in capacitors, according to embodiments, a transition point of the insulation composition may be configured to be in the range from about 30° C. to about 90° C., more preferably from about 40° C. to about 70° C. Thereby, the insulation composition is in the liquid state above the transition point. Below this transition point, the insulation composition is in the gel state. Typically, according to embodiments, the insulation composition cools down in the event of a leakage of an enclosure of the capacitor. Once the insulation composition has cooled down to a temperature below the transition point, it transforms into the gel state. This happens when the insulation composition drops down to an earth surface, and/or when it comes into contact with a surface, e.g. the earth surface, in particular soil. As was described above, the gelation may already happen during passage of the insulation composition through the leak in the enclosure. This may be used as a self-healing or self-sealing process of such a leak. Typically, as the gel has only limited mechanical stability, the former process is mainly applicable to rather small leaks, such as of a pinhole size. When the insulation composition is configured to have a sufficiently high complex viscosity, the self-healing process may be applied also to leaks having larger dimensions. Typically, the transition point may be chosen to be about 1° C. to about 10° C. higher than the maximum environmental temperature expected during operation of the capacitor. Hence, an oil-to-gel transition of a leaked or spilled amount of insulation composition will be fostered or caused under all normal operating conditions of the capacitor.

Generally, according to embodiments, the above described insulation composition comprises an aromatic oil. The aromatic oil may be a synthetic oil or a natural oil, or a mixture of the former. Non-limiting examples for applicable aromatic oils are, e.g. monobenzyl toluene, dibenzyl toluene. The latter is, e.g., included in the exemplary commercial products Faradol 600, Faradol 670 and Faradol 810.

Generally, in embodiments, the insulation composition comprises a polymer at a concentration of about 0.1 wt. % to about 10 wt. %, more particularly from about 0.5 wt. % to about 7 wt. %. The polymer fosters or causes the above-described thermo-reversible oil-to-gel formation. Typically, the polymer comprises a copolymer, a block copolymer, or mixtures thereof. The block copolymer may be a tri-block copolymer or a di-block copolymer, or mixtures thereof.

Characteristic examples of polymers that have been tested by the inventors to provide a thermo-reversible oil-to-gel transition, when mixed with aromatic oils, are: ethylene-butyl acrylate (e.g. SCONA TSEB 2113 from Byk, or Elvaloy AC 3427, Elvanoy 34035, Fusabond A560 from Dupont), styrene-ethylene-(ethylene-isopropylene)-styrene (e.g. TPKD 5103 from Byk), ethylene-vinylacetate (e.g. TPEV 1112 from Byk), ethylene-butyleneacrylate (e.g. TSEB 2113 from Byk), and syndiotactic polystyrene (e.g. TPSPS 9012 from Byk). The transition from the gel to the liquid state is thermo-reversible and is typically observed above a certain temperature (gelling point) during heating. The contrary observation, that is, the insulation composition being in the liquid state below the gelling point and in the gel state above it, was made with the formulation containing a styrene-ethylene-(ethylene-isopropylene)-styrene additive.

The exact mechanism of the thermo-reversible gelation is not fully understood. Without wishing to be bound by theory, a plausible explanation for the oil-to-gel transition with block copolymers (as a particular example) may be as follows: block copolymers consist of hard and soft segments. At low temperatures, the hard segments have the tendency to cluster together creating ordered structures, which can be regarded as crystalline areas, which are acting as crosslinking points in a gel, which can be described as a 3D network formation. At higher temperatures, these crystalline areas melt and the formulation converts to the liquid state. Thus, the formation of the gel happens below a certain temperature. When the gel is subsequently heated above this temperature, the gel becomes liquid again. The gel process according to embodiments is hence thermo-reversible. Also some copolymers lead to the above behaviour of an insulation composition, which is described further below.

Generally, in embodiments, insulation compositions are configured to have a complex viscosity of equal or greater than 0.01 Pa·s at a temperature below the transition point or gel point. At temperatures above the gel point, the complex viscosity is substantially equal, with a difference of less than about 30%, more particularly less than 15%, to the complex viscosity of the insulation composition without the polymer. Typically, the insulation composition has a complex viscosity at a temperature below the gel point, which is about a factor of at least 70, more particularly a factor of at least 100, larger than the complex viscosity at temperatures above the gel point.

The temperature of the gel point or transition point, at which the oil-to-gel transition takes place, depends mainly on the type of aromatic oil(s) used as the basis for the insulation composition, on the type of the polymer(s), and on the amount of the polymer in the insulation composition.

Experimental Tests: Viscosity Profile Tests

Figure 1:
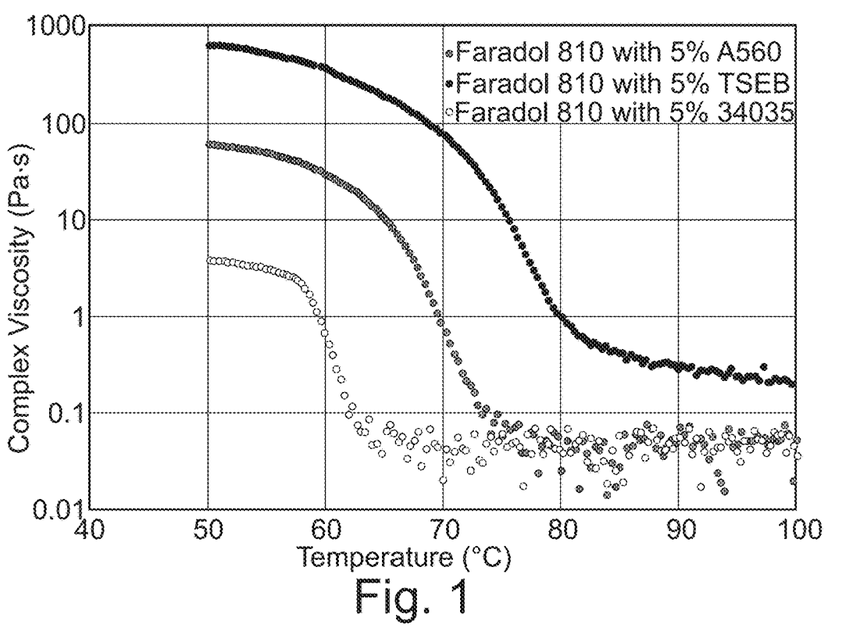
FIG. 1 shows a graph indicating a complex viscosity of insulation compositions according to embodiments, as a function of temperature.

The complex viscosity over a temperature range of interest was measured by a rheometer at a frequency of 1 Hz (and with an amplitude of 0.5%). Three ethylene-butyl acrylates (EBA) tested in Faradol 810 aromatic fluid are presented in the following as characteristic examples. Table 1 shows the physical properties of the EBA additives. In FIG. 1, it is shown that the gel transition temperature, i.e. the onset temperature of the viscosity reaching a low value plateau, correlate to the melting flow rate (MFR) of the EBA additives (34035 vs. A560) and chemical modification (A560 vs. TSEB).

TABLE 1

Physical properties of the EBA additives as employed in examples shown in FIG. 1

| Commercial Name | Supplier | MFR (190° C., 2.16 kg, cm$^3$/10 min) | Melting Point (° C.) | Gel Transition Point (° C.) | Remark |
|---|---|---|---|---|---|
| SCONA TSEB 2113 | BYK | 3-10 | 50-140 | 82 | 0.6% MAH grafted (monocyclic aromatic hydrocarbon, polymerized) |
| Fusabond A560 | Dupont | 5.6 | 94 | 72 | With undisclosed additives |
| Elvaloy AC 34035 | Dupont | 40 | 90 | 62 | butyl acrylate content |

Figure 2:
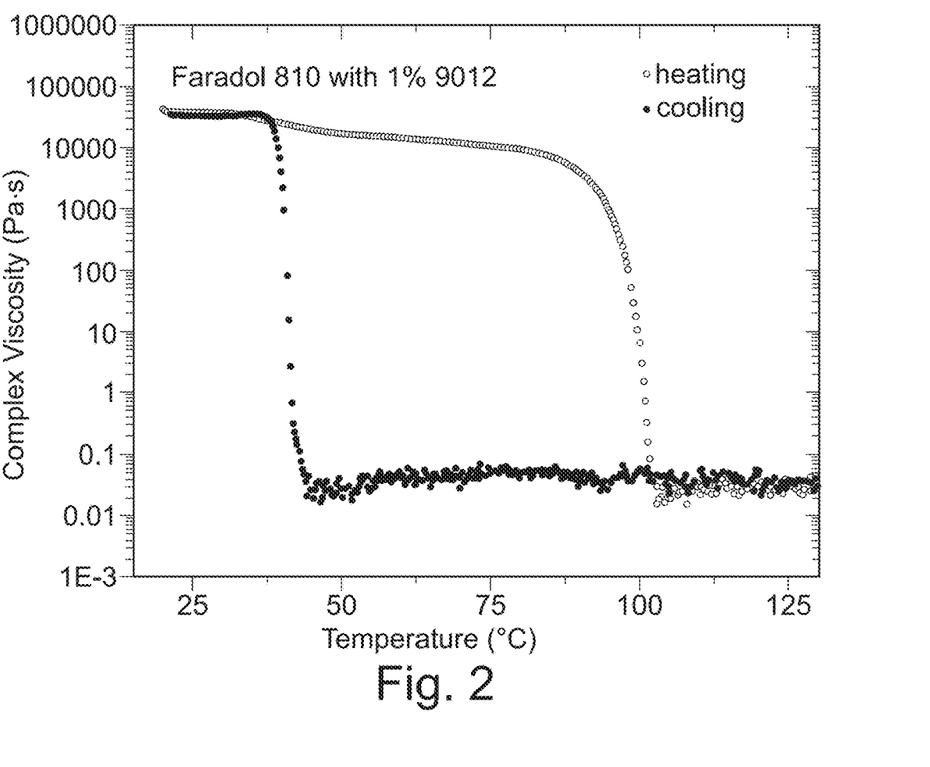
FIG. 2 shows a graph similar to that of FIG. 1, for compositions of further embodiments, and showing hysteresis upon heating and cooling.

Typically, the thermo-reversible transition is observed at the same temperature during heating or cooling under thermal cycling. However, an exceptional behavior was observed for the formulations containing a syndiotactic polystyrene additive. In this case, a hysteresis of the transition during cooling compared to the observed one during heating was found, as is exemplarily shown in FIG. 2. In the figure, the temperature dependence of the complex viscosity is shown for gel formulations with syndiotactic polystyrene additives. The described behavior may in embodiments be advantageously employed in terms of processing during manufacturing, i.e. heating the formulation above the transition point, then cooling it down, and finally filling or impregnating the product at a lower temperature T—hence, the insulation composition or formulation is still in the liquid phase, although it is below the gel point or transition point.

Experimental Tests: Soil Spillage Test

Figure 3:
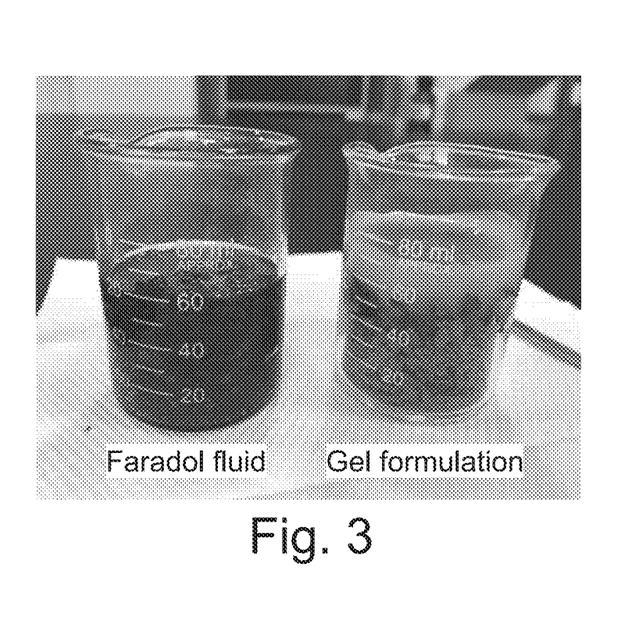
FIG. 3 shows the results of a spillage test on soil for an insulation composition according to embodiments, and for a comparative conventional insulation composition.
Figure 4:
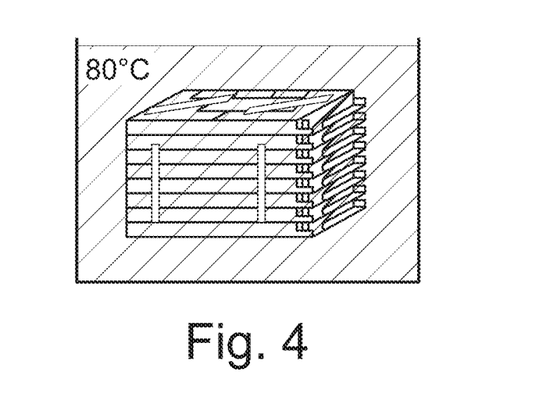
FIG. 4 shows schematically a production method according to embodiments.

About 40 ml of liquid aromatic oil, and of gelated aromatic-oil-based insulation composition samples (oil with 5 wt % 34035, see further above and FIG. 1) were heated to 100° C. and were then directly poured into glass beakers containing soil at ambient temperature (26° C.). FIG. 3 shows photographs of the beakers five minutes after pouring the liquid. It is obvious that the pure aromatic oil (Faradol 810, left in FIG. 3) fully penetrated and immersed throughout the soil. However, the gel (right in FIG. 3) formed a thin layer on the top surface of the soil. Thus, the contamination can easily be removed and collected, without further and deeper contamination penetration into the soil. The employed gelation process is highly useful for preventing environmental damage upon any type of leakage—since the gel stays, e.g., only on a surface of a contaminated area of soil, for example, and is not able to penetrate the soil. The gel can subsequently easily be removed from the contaminated soil or other area. Hence, an environmental friendly solution is provided. It can also lead to significant weight reduction and cost reduction when applied in, e.g., capacitor banks, as conventionally used underneath-placed concrete or metal oil reservoirs (so-called fall-back reservoirs) may be omitted. Further, the overall life cycle may be improved, and maintenance costs can be reduced, as small leakages can be self-healed by the gel, or at least be retarded, such that the time until arrival of maintenance personnel on the repair site may be prolonged, increasing a respective planning flexibility.

Production Methods

Embodiments described herein pertain to the production of wet capacitors. Three different exemplary procedures to produce gel-insulated impregnated capacitors are described in the following. It is understood that these should not be regarded as limiting, but that the skilled person may, for example, partially combine them to yield further embodiments. As most of the process steps such as putting the wound or wrapped film package or dielectric package into a container, filling up the container with an insulation composition, and sealing the container, are standard steps, they are not shown in detail in the schematic FIGS. 4, 5A, 5B, 5C, 6A, 6B, and 6C.

a) Direct Hot Impregnation with Insulation Composition

In an embodiment for producing a wet capacitor with insulation composition according to embodiments, the following is proposed. Packages of polymeric capacitor films and aluminum foils wrapped by insulation papers, or a metallized film package, are impregnated at reduced pressure and at elevated temperature. An exemplary suitable temperature is about 80° C. for a formulation with an insulation composition comprising aromatic oil and 5 wt. % of a polymer named 34035, which is applied for about 10-20 hours, which step is exemplarily shown in FIG. 4. This allows the hot liquid gel to impregnate the package and allows the films to swell. Then, the container with the film/foil packages, or the metallized film package, and the gel is cooled down to room temperature. Additional gel is filled in due to shrinkage, and the container is finally sealed.

b) Thick Insulation Composition Pre-Loading

Figure 5A:
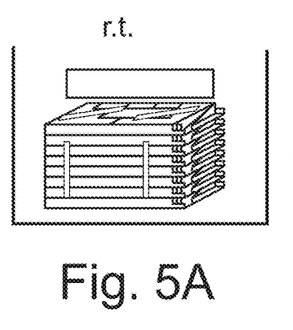
FIG. 5A-5C show schematically a further production method according to embodiments.
Figure 5B:
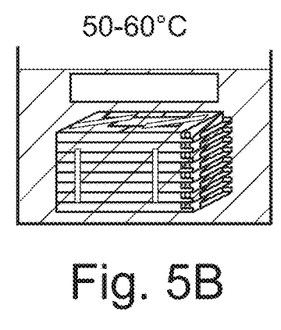
Figure 5C:
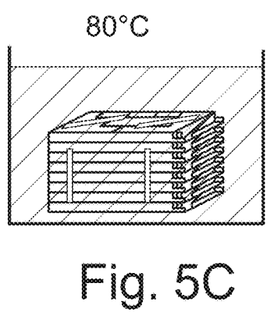

In a further exemplary method according to embodiments as schematically shown in FIG. 5A to 5C, hot concentrated insulation composition (25 wt. % of polymer, e.g. 34035) is first added into the container, which includes the film/foil package, or the metallized film package, which is below the gel transition temperature or gel point, e.g. at room temperature (abbreviated as r.t. in the figures) as shown in FIG. 5A. Then, the container is filled with pure aromatic oil and thick insulation composition at a reduced pressure (about equal to or smaller than 50 mbar), at below the gel transition temperature, e.g., at about 50° C. to 60° C., as shown in FIG. 5B. After sealing the container, the container is then heated to about 80° C., as shown in FIG. 5C. The thick insulation composition and the oil is mixed at an elevated temperature. Finally, the container is cooled down to room temperature.

c) Replacement of Excessive Oil

Figure 6A:
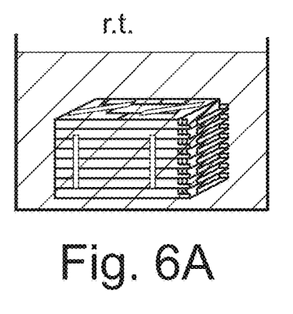
FIG. 6A-6C show schematically a yet further production method according to embodiments.
Figure 6B:
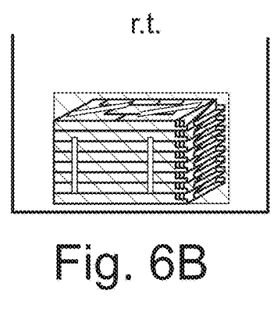
Figure 6C:
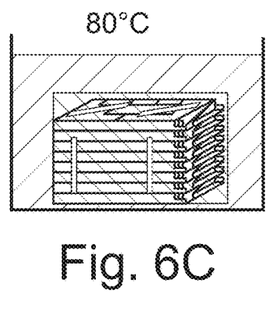

A further method according to embodiments is shown in FIG. 6, namely in FIG. 6A to FIG. 6C. A container with film/foil package or a metallized film package is filled with pure fluid, e.g. pure aromatic oil, for impregnation of the film package, at reduced pressure and is stored for, e.g., about 20-60 hours, which is schematically shown in FIG. 6A (at room temperature r.t.). This allows the films to swell in the oil, wherein the optimal time span may vary, such as for the methods described above, depending on the specific insulation composition, the type of the films, etc. Furthermore, the excessive oil is removed by emptying the container at room temperature (r.t.), shown in FIG. 6B. Subsequently, the container is then heated to about 80° C., is filled with hot insulation composition (5 wt % of polymer, e.g. 34035, at 80° C.) as shown in FIG. 6C, and is then cooled down to room temperature (not shown). Finally, more insulation composition is filled to compensate shrinkage, and the container is sealed (not shown).

In optional embodiments, the following steps may be carried out after the impregnation process: After allowing the capacitor dielectric, i.e., the film/foil package or metallized film package, to absorb enough impregnating material as a part of the swelling process (FIG. 6A), the extra impregnating material not absorbed by the dielectric is drained. Exemplarily, about 2 liters to about 10 liters of oil, more particularly, about 3 liters to about 5 liters of oil, can be drained out from a capacitor unit. Subsequently, the capacitor unit is filled up with insulation composition, plastic material or with a mineralic substance, in particular with polyurethane or sand, or with a mixture of any of these mentioned substances. The plastic or mineralic material is typically provided in a powdered form, allowing the substance to reach also small cavities inside the container with the package.

A suitably chosen plastic, such as exemplarily polyurethane, is much less flammable than the aromatic oil or the insulation composition, a property which is even surpassed by the mineralic substance, such as, e.g., sand, preferably quartz sand. While sand is absolutely inflammable, it is also more dense than plastic. Hence, depending on the safety and weight requirements in a particular application for a specific capacitor, plastic or mineralic substance may be chosen, while also a mixture of both may be suitable. Optionally, the space in the container—other than the dielectric package—may be filled by such a mixture, which additionally comprises a part of the insulation composition exhibiting the thermo-reversible oil-gel-transmission as described herein.

The invention claimed is:
1. A capacitor, comprising:
a container, comprising:
at least one wound package of a metal foil and a polymeric insulating film, or of a metallized polymeric film, and
an insulation composition,
wherein the insulation composition comprises:
a synthetic aromatic oil or a natural aromatic oil, and
a polymer in a concentration of about 0.1 wt % to about 10 wt %,
wherein the insulation composition is configured to undergo a thermo-reversible gelation below a gel-point temperature in the range from about 30° C. to about 90° C., the gel point being defined as the temperature at which the storage modulus G' of the insulation composition is equal to the loss modulus G" of the insulation composition.
2. The capacitor of claim 1, wherein the insulation composition has a complex viscosity at a temperature below the gel point, which is about a factor of at least 70 larger than the complex viscosity at temperatures above the gel point.

3. The capacitor of claim 1, wherein the insulation composition has a complex viscosity of equal to or greater than 0.01 Pa·s at a temperature below the gel point, and a complex viscosity at temperatures above the gel point which is substantially equal, with a difference of less than about 30%, to the complex viscosity of the insulation composition without the polymer.

4. The capacitor of claim 1, wherein the polymer comprises a polymer and/or a copolymer and/or a block copolymer, a tri-block copolymer and/or a di-block copolymer, which is selected from at least one of:
ethylene butyl acrylate;
styrene-ethylene-(ethylene-isopropylene)-styrene;
ethylene-vinylacetate;
ethylene-butyleneacrylate; and
syndiotactic polystyrene.

5. The capacitor of claim 1, wherein the insulation composition further comprises an additive, being at least one of:
an inorganic filler, at a concentration of 10 wt. % or less based on the total weight of the insulation composition, and
an antioxidant, at a concentration of 2 wt. % or less based on the total weight of the insulation composition;
and wherein a space in the capacitor other than the wound package is filled up with the insulation composition or with plastic material or with a mineralic substance, or with a mixture of any of these substances.

6. The capacitor of claim 1, wherein the aromatic oil comprises a benzyl-toluene.

7. A capacitor according to claim 1, comprising:
an oil-based insulation composition is absorbed by the at least one wound package,
and wherein a space in the container other than the wound package is filled up with a plastic material or with a mineralic substance, or with a mixture that includes a dielectric fluid.

8. A method of producing the capacitor according to claim 1, comprising:
adding hot gel into the container with the metal film, the polymeric insulating film or the metallized polymeric film at below the gel transition temperature,
filling the container with the aromatic oil at reduced pressure below the gel transition temperature,
sealing the container,
heating the container to about 80° C., and mixing the gel and oil at elevated temperature, and
cooling the container down to room temperature.

9. A method of producing a capacitor according to claim 1, comprising: filling the container with the at least one wound package with the insulation composition at reduced pressure,
storing for 20-60 hours to allow the films to swell in the oil,
removing excessive oil that was not absorbed by the at least one wound package, by emptying the container at room temperature,
heating the container to about 80° C.,
filling the container with the insulation composition that was heated; or alternatively filling up the container with a plastic material or with a mineralic substance or a mixture thereof or a mixture thereof together with the insulation composition;
cooling the container down to room temperature,
filling up the insulation composition to compensate shrinkage, and
sealing the container.

10. A method of treating a leak in a capacitor that includes:
a container, comprising:
at least one wound package of a metal foil and a polymeric insulating film, or of a metallized polymeric film, and
an insulation composition,
wherein the insulation composition comprises:
a synthetic aromatic oil or a natural aromatic oil, and
a polymer in a concentration of about 0.1 wt % to about 10 wt %,
wherein the insulation composition is configured to undergo a thermo-reversible gelation below a gel-point temperature in the range from about 30° C. to about 90° C., the gel point being defined as the temperature at which the storage modulus G' of the insulation composition is equal to the loss modulus G" of the insulation composition, the method comprising:
operating the capacitor, wherein the insulation composition is configured such that the insulation composition is in a liquid phase during standard operation of the capacitor, in case of a leak in the capacitor to the outside, spilling an amount of the insulation composition through the leak, and
wherein the spilled amount undergoes a thermo-reversible oil-to-gel transition during or after the spilling when the spilled amount is exposed to the temperature outside the container.

11. A method of producing a capacitor that includes a container, comprising:
at least one wound package of a metal foil and a polymeric insulating film, or of a metallized polymeric film, and
an insulation composition,
wherein the insulation composition comprises:
a synthetic aromatic oil or a natural aromatic oil, and
a polymer in a concentration of about 0.1 wt % to about 10 wt %,
wherein the insulation composition is configured to undergo a thermo-reversible gelation below a gel-point temperature in the range from about 30° C. to about 90° C., the gel point being defined as the temperature at which the storage modulus G' of the insulation composition is equal to the loss modulus G" of the insulation composition, the method comprising:
wrapping packages of the metal foil and the polymeric insulating film or of the metallized polymeric film, by insulating papers; heating the insulation composition;
impregnating the wrapped packages, with the heated insulation composition, at a reduced pressure and an elevated temperature, to allow the heated insulation composition to impregnate the package, and letting the films swell for several hours,
cooling the container with the packages and allowing the insulating composition to gel at room temperature, refill the insulation composition to compensate shrinkage, and
sealing the container.

* * * * *